(12) United States Patent
Bosshart

(10) Patent No.: US 8,131,791 B2
(45) Date of Patent: Mar. 6, 2012

(54) DECISION FEEDBACK EQUALIZER HAVING PARALLEL PROCESSING ARCHITECTURE

(75) Inventor: Patrick W. Bosshart, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 988 days.

(21) Appl. No.: 12/107,574

(22) Filed: Apr. 22, 2008

(65) Prior Publication Data

US 2009/0265406 A1 Oct. 22, 2009

(51) Int. Cl.
*G06F 17/10* (2006.01)
(52) U.S. Cl. ........................................ 708/323
(58) Field of Classification Search .................. None
See application file for complete search history.

(56) References Cited

U.S. PATENT DOCUMENTS

| | | | | |
|---|---|---|---|---|
| 5,430,661 A | * | 7/1995 | Fisher et al. | 375/233 |
| 5,966,262 A | * | 10/1999 | Brickner et al. | 360/65 |
| 6,363,112 B1 | * | 3/2002 | Azadet et al. | 375/233 |
| 7,333,577 B2 | * | 2/2008 | Becker et al. | 375/350 |
| 7,583,728 B2 | * | 9/2009 | Chen et al. | 375/229 |

* cited by examiner

*Primary Examiner* — David H Malzahn
(74) *Attorney, Agent, or Firm* — John R. Pessetto; W. James Brady; Frederick J. Telecky, Jr.

(57) ABSTRACT

An integrated circuit includes a decision feedback equalizer (DFE) including a first and second digital equalizer logic including circuitry to compensate first and second bits in a received stream and to provide first and second sign bits. The second equalizer logic can run concurrently and can be connected in parallel relative to the first equalizer logic. The second equalizer logic can include a low and high sign bit pipelines providing first and second conditional sign bits by assuming a low and high sign bits, respectively, for a first bits being concurrently processed by the first equalizer logic and a sign bit selection element to select between the first and second conditional sign bits based on the sign bit outcome of the first equalizer logic. The first and second pipelines compensate bits using compensation weights chosen using most recent first and second conditional sign bits and sign bit outcome.

20 Claims, 6 Drawing Sheets

DECISION FEEDBACK EQUALIZER HAVING PARALLEL PROCESSING ARCHITECTURE

FIELD OF THE INVENTION

This invention related to digital signal processing and more specifically to decision feedback equalizers having parallel processing arrangements.

BACKGROUND

High speed digital communications between integrated circuits is typically accomplished using a serial links, such as serializer-deserializer (SerDes) blocks. These blocks convert data between serial data and parallel interfaces in each direction of communication. However, such blocks are generally unable to handle the transmission of differential signals between integrated circuits as the bit rate is increased above a certain level. For example, in some differential pin pair designs, the bit rate has increased to 12.5 Gigabits per second (Gbps). At such bit rates, the frequency response of the signal path between integrated circuits is typically inadequate and generally results in a significant distortion of the digital signal waveforms. These distortions can result in significant intersymbol interference (ISI) as a signal associated with a first bit is distorted, which is known to affect signals associated with one or more later adjacent bits in the bit stream.

In general, adaptive equalization techniques using digital filters can be used to substantially cancel out these distortions so that the signal bits can be detected without error. One common type of digital filter is the decision feedback equalizer (DFE) 100, shown in FIG. 1. A DFE is a recursive filter based on the principle that once the value of a currently transmitted bit has been determined, it is possible to substantially remove the ISI contribution of that bit from future received bits using a feedback loop. Accordingly, once the value of the received bit shown as r(t) has been determined, a feedback structure for the DFE can be used to calculate the ISI effect of the received bit on subsequently received bits and to calculate the appropriate compensation required for the next received bit. This compensation is typically provided by using at least one adder circuit 105 operable to add or subtract at least one correction term to the input r(t). Typically, a slicer circuit 108 is used to detect the polarity of the compensated signal to convert it to a digital high ("1") or a digital low ("0") signal to generate an output value for the DFE, shown as r̂(t). A feedback loop through one or more output registers or delay blocks (shown as $z^{-1}$) can be used to hold a history of compensated values for one or more bit times and allows the effect of multiple preceding bits to be taken into account for determining the proper compensation to be applied at the adder 105. The preceding bit values are typically multiplied a weight $w_x$ (x=1, 2, 3, . . . ) in the DFE, which are then added at the adder 105 to the next received bit signal. Therefore, so as long as the circuit correctly detects a received bit, the DFE 100 can generally apply the proper correction to substantially eliminate the distortion caused by preceding bits. Accordingly, as the number of preceding bits used is increased, the accuracy of the DFE is generally increased.

In practice, when equalizing over multiple bits of history, the resulting bits of history generated by the delay blocks are generally used as vectors to provide a select control for one or more multiplexers, where the sums of all the correction weights have been pre-computed. This approach has the advantage of reduCINg hardware by eliminating the separate additions steps required for each of the correction terms. It also helps to reduce roundoff errors, so that an equivalent quality of results can generally be obtained with datapaths containing fewer bits. However, the number of inputs to a multiplexer doubles with each additional bit of history used, and therefore such implementations generally suffer a limit on the history length for equalization. Additionally, in such implementations, the clock frequency must be≧the bit rate of the input signal. Accordingly, at high bit rates, it is generally difficult and in some cases not possible to implement a digital logic arrangement capable of running at the full bit rate of the input signal. Therefore, what is needed is a new compensating filter design that can provide the necessary corrections to input signals including high bit rate signals without generally requiring the clock frequency to be≧the bit rate of the input signal.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An integrated circuit includes a decision feedback equalizer (DFE) formed on the integrated circuit operable to receive a received stream of bits and provide a compensated stream of sign bits. The DFE includes a first digital equalizer logic comprising pipeline including an adder and sign bit detection circuitry operable to process a first portion of bits in the stream of bits and provide first sign bits of the compensated stream of sign bits. A second digital equalizer logic comprising pipeline includes an adder and sign bit detection circuitry running concurrently with the first pipeline connected in parallel relative to the first pipeline operable to process at least a portion of bits in the received stream of bits other than the first portion of bits. The second pipeline includes low (e.g. digital 0) sign bit pipeline circuitry operative to provide a first conditional compensated sign bit output by assuming a low sign bit for a next bit to be processed by the first pipeline and high (e.g. digital 0) sign bit pipeline circuitry operative to provide a second conditional compensated sign bit output by assuming a high sign bit for the next bit to be output by the first pipeline. A selection element is coupled to receive the first and second conditional compensated bits and a determined sign bit outcome for the next bit, and is operable to select between the first and second conditional sign bits based on the determined outcome.

DETAIL DESCRIPTION OF THE DRAWINGS

Figure 1:
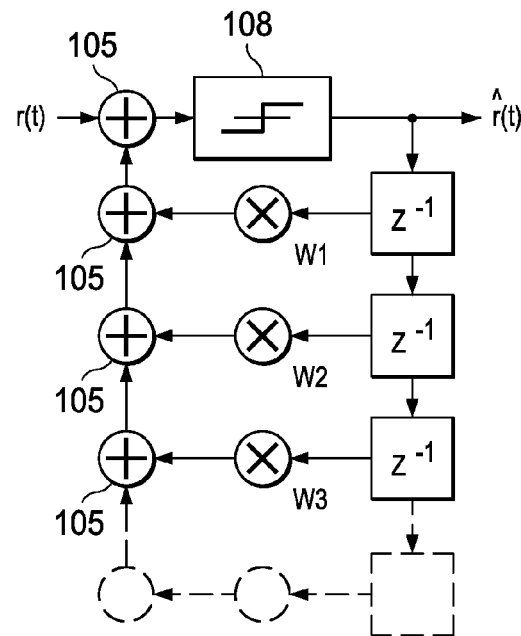
FIG. 1 is a schematic representation of a conventional decision feedback equalizer.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts can occur in different orders and/or concurrently with other acts or events. Furthermore, not all illustrated acts or events are required to implement a methodology in accordance with the present invention.

Figure 2:
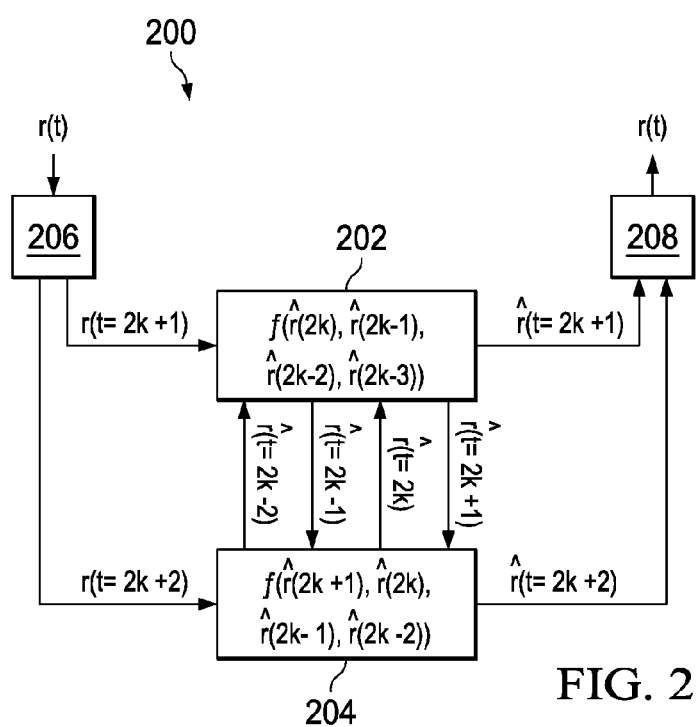
FIG. 2 is a block diagram of a decision feedback equalizer (DFE) according to an embodiment of the present invention.

One aspect of the present invention provides a DFE design operable for compensating a received stream of bits, including high bit rate data streams, using a new parallel processing circuit arrangement. An exemplary schematic for a DFE comprising circuit 200 according to an embodiment of the invention is shown in FIG. 2, comprising first DFE 202 and second DFE 204 connected in parallel between a sampling circuit 206 and a combining circuit 208. In operation, sampling circuit 206 splits the data input signal, shown as r(t), so that generally alternating bits in a bit stream are directed to LFE 202 and 204. For example, sampling circuit 206 samples the input signal r(t) and can direct signals associated with odd bits, $r(t= \ldots, 2k+1, \ldots)$, for processing by the first DFE 202. Similarly, the sampling circuit 206 samples the input signal and directs signals associated with even bits, $r(t= \ldots, 2k+2, \ldots)$, for processing by the second DFE 204. Accordingly, each of the DFEs 202 and 204 compensate alternating bits for distortion and generally only require a clock rate equal to half the bit rate of the input signal r(t). Although only two (2) DFEs 202 and 204 are shown in FIG. 2, the invention can be practiced with three (3) or more DFEs connected in parallel and/or with a bit allocation scheme other than alternating (e.g. other than even/odd).

As previously noted, DFE's generally require knowledge of a plurality of immediately preceding bits in a bit stream to properly compensate the current bit. For example, in circuit 200, each of the DFEs 202, 204 uses information from the previous 4 received bits to compensate the current bit. Consequently, the first DFE 202 which processes odd bits generally utilizes compensated values for even history bits (e.g., at t=2k and t=2k−2), even though it does not calculate these values. Similarly, the second DFE 204 also utilizes previously compensated odd bit history values (e.g. at t=2k+1 and 1=2k−1). As known in the art, history bit values can be stored using output registers or delay circuit elements.

Accordingly, in various embodiments of the invention, DFEs 202, 204 are coupled to one another to communicate such values, as shown in FIG. 2. Using these historical bit values, DFEs 202, 204 can then generate compensated signals $\hat{r}(t=2k+1)$ and $\hat{r}(t=2k+2)$, respectively. The compensated signals can then be output to a combining circuit portion 208 which is operable to output the full compensated bit stream, $\hat{r}(t)$.

Although circuit 200 shows compensated values being exchanged between DFEs 202, 204 during operation of circuit 200, since DFEs 202, 204 are operating concurrently and at a clock rate lower than that of the received bit rate, DEE 204 will generally not have access to a compensated value $\hat{r}(t=2k+1)$ from DFE 202 when it begins to compensate the next bit in the bit stream. Therefore, another aspect of the present invention allows the DFE to not have to wait for the compensated preceding bit to be output to begin concurrently compensating the subsequent bit.

In particular, embodiments of the present invention include DFE designs that use a first DFE for calculating the compensated value for a first bit and at least two other concurrently operating DFEs for calculating one or more subsequent bits. For example, referring to the exemplary DFE comprising circuit 200 shown in FIG. 2, DFE 204 which is operable for compensating the even bits can itself comprise a pair of concurrently operable DFE's. In such embodiments, the first of this pair of DFEs can be configured to assume that the next yet to be determined compensated value of the next odd bit by DFE 202 will be high (next odd bit=1) and uses this assumption to determine an appropriate compensated value for the second bit. Similarly, the other DFE of the pair can be configured to assume the other possibility being the compensated value of the next odd bit to be determined by DFE 202 will be low (next odd bit=0) and using this assumption determine an appropriate compensated value for the even bit. Therefore, using two concurrently operating DFE's for circuit portion 204, circuit portion 204 can calculate the two possible compensated values for the even bit before the next odd bit is determined by DFE 202. Subsequently, once the value of the next compensated odd bit state is determined by DFE 202, the odd bit determination can be used to select which of the pair of DFE outputs provided by DFE 204 should be used for the next even bit $\hat{r}(t=2k+2)$. Thus, DFE 204 does not have to wait for the preceding bit determination to be completed to begin concurrently compensating the subsequent bit. Therefore, by using the possible values to determine the next even bit, the next even bit can be determined without having to incur the additional gate delay needed to determine the next odd bit. That is, the start of the determination of the next even bit need not wait for the next odd bit to be determined.

Although the exemplary embodiments described herein generally refer to arrangements in which alternating bits are processed by first and second DFEs, such as that described for circuit 200 shown in FIG. 2, as described above, embodiments of the present invention are not limited in this regard. For example, in some embodiments of the present invention, the DFEs can comprise more than 2 circuit compensating portions to increase the number of concurrently compensated bits. For example, each additional circuit portion can comprise two DFEs for each preceding value that is concurrently being compensated. For instance, a digital filter that compensates three adjacent bits concurrently could be realized with three DFEs for calculating the first and second compensated values, and an additional 4 DFEs to account for the 4 combinations of possible values for the first and second bits in the stream. Such arrangements can be used in applications where the maximum possible clock rate for a circuit portion of a digital filter is limited to a value less than half the bit rate.

Figure 3A:
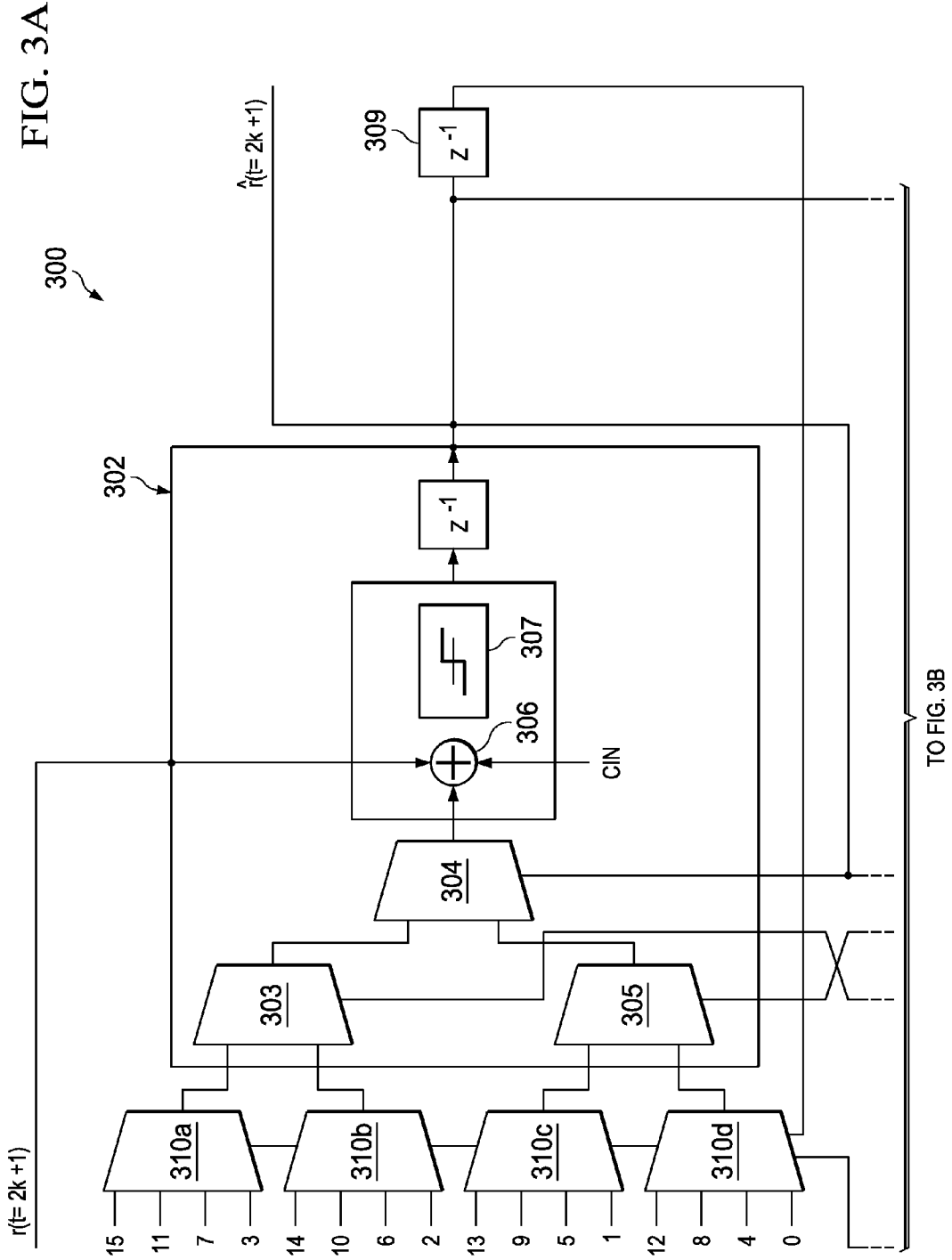
FIGS. 3A and 3B show a block diagram of an implementation of a DFE according to an embodiment of the present invention.
Figure 3B:
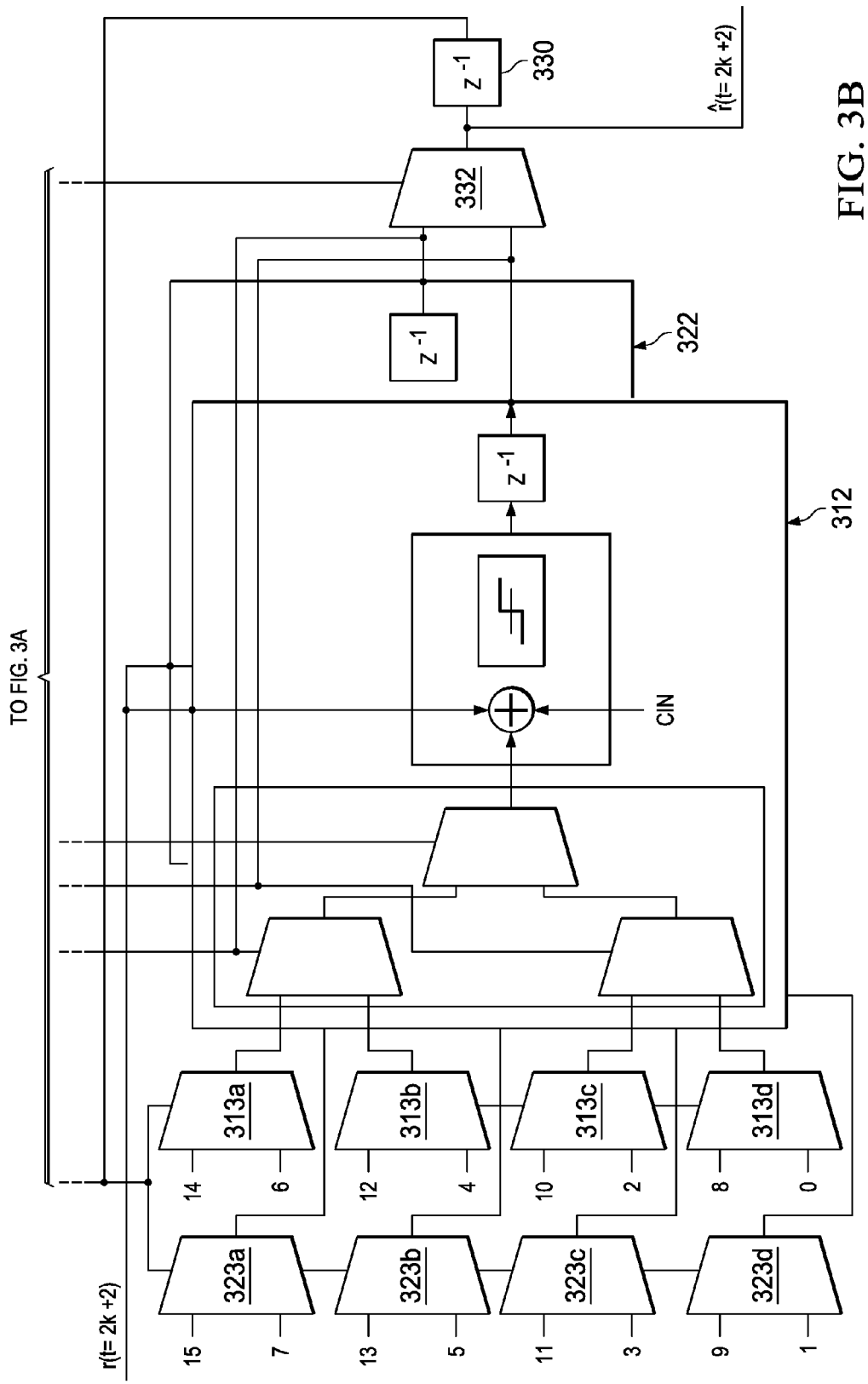

An exemplary embodiment of a DFE-comprising integrated circuit 300 according to an embodiment of the present invention is shown in FIGS. 3A and 3B which implements the functionality associated with circuit 200 shown in FIG. 2. As shown in FIGS. 3A and 3B, circuit 300 includes first DFE comprising pipeline 302 and associated circuitry for compensating odd bits in a received bit stream, r(t=2k+1). The circuit 300 also includes a second DFE comprising pipeline 330 and associated circuitry comprising pipelines 312 and 322 hooked in parallel for compensating even received bits in the stream, r(t=2k+2). In the illustrated embodiment, pipeline 312 is configured to assume that the output of the bit being concurrently processed and not yet available by pipeline 302 will be low (e.g., bit=0), while pipeline 322 is configured to assume that the output of the bit being concurrently processed and not yet available by pipeline 302 will be high (e.g., bit=1).

Pipeline 302 comprises three two-input multiplexers 303-305 forming a 4-input tree multiplexer, followed by an adder 306, sign detect circuit 307 and an output register D 308. The adder 306 can have a carryin input (CIN) for inverted and non-inverted inputs, as described below. As one of ordinary skill in art will recognize, "sign detect" circuitry refers to circuitry operable to determine whether a received signal is a digital "high" signal (bit=1) or a digital "low" signal (bit=0). Thus in the various embodiments of the present invention, output registers stored not the compensated bits, but a generated sign bit. That is, the determination by the sign detect circuit of whether the compensated bit is a digital high or a digital low value.

Pipeline 312 and 322 can each have an identical multiplexer, adder, sign detect circuit, and output register structures relative to pipeline 312. Additional multiplexers 310a-310d for pipeline 302, multiplexers 323a-d for pipeline 322 and multiplexers 313a-313d for pipeline 312 are shown outside the respective pipeline 302 blocks, which provide the input signals to multiplexers 303 and 305. These multiplexers are shown for the case of equalizing over a 4 bit history. In that case, there are $2^4$=16 candidate correction offsets. For pipeline 302, the candidate offsets are multiplexed down to 4 by multiplexers 310a-310d, using the 3rd and 4th history bits. For pipeline 330, the first history bit is the one simultaneously produced by pipeline 302. The second and third history bits are the ones produced in the earlier clock cycle by pipeline 330 and pipeline 302, and are fed directly back from the pipeline 330 and pipeline 302 outputs to their respective tree multiplexer inputs. The fourth history bit is the bit produced by pipeline 330 with an additional cycle of delay provided by delay element 340. Thus, pipeline 302 processes 4 inputs, produced by 4 4-input multiplexers 310a-310d controlled by the 3rd and 4th history bits. Pipeline 330 processes 8 inputs, produced by 8 2-input multiplexers 323a-323d and 313a-313d controlled by the 4th history bit.

In circuit 300 the data inputs to multiplexers 310a-310d, 323a-323d and 313a-313d are numbered with indices from 0 to 15, corresponding to the history selection codes. As described above, pipeline 330 assumes its first history sign bit (from pipeline 302) is low (e.g., bit=0), so all of its multiplexer inputs will have even correction indicies associated with even compensation weights. Pipeline 322 assumes its first history sign bit (from pipeline 302) is high (e.g., bit=1), and accordingly, has odd correction indicies associated with odd compensation weights. While pipeline 302 outputs one bit which is the proper output for the odd bitstream bits, pipeline 330 outputs two candidate results for the even bits, one assuming the result of pipelines will be 0, the other assuming the result of pipeline 302 will be 1. Following pipelines 312 and 322 is a two input multiplexer 332 operable to select the proper output using a control select signal from the output of pipeline 302.

Another complication occurs in the control of the 4-input tree multiplexers 303-305 at the front of the respective pipelines. The selects for these multiplexers should generally be the two most recently detected history bits, which are the outputs of the pipelines 302 and 330. Pipeline 302 outputs the earlier of those two history bits, but pipeline 330 does not output the latest history bit, rather it outputs two candidates for that history bit, so the actual history bit does not exist unless the output of the subsequent multiplexer 332 is used, which would generally add undesirable additional delay, as previously described. However, embodiments of the present invention use the structure of the 4-input tree multiplexers 303-305 advantageously to resolve any potential issues. As described above, the 4-input tree multiplexers 303-305 comprises two first level 2 input multiplexers 303 and 305 followed by a second level 2 input multiplexer 304. The second level multiplexer 304 is controlled by the earlier bit output by pipeline 302. However, rather than needing to use the final value calculated from pipelines 312 and 322, the two first level multiplexers 303 and 305 can be controlled by the output of both pipelines 322 and 312. Accordingly, the output of the bottom first level multiplexer 305 goes to the 0 input of the second level multiplexer 304, the one chosen when the earlier history bit out of pipeline 302 is 0. When this is the case, pipeline 312 is the candidate which is chosen for pipeline 330's output. The output from pipeline 312 is thus used to control the bottom first level multiplexer 305, since when that multiplexer output is selected by the second level multiplexer 304, the conditions for pipeline 312 to be valid are met. Likewise, the top first level multiplexer 303 is controlled by the output of pipeline 322.

As described above, pipelines 302, 312 and 322 can utilize substantially the same circuitry. Although not essential to practiCINg the invention, the use of the same circuitry allows a single standard cell based design to be used to repeatedly place the pipelines in circuit 300. However, the invention is not limited in this regard and in other embodiments, the design for pipelines 302, 312 and 322 need not be the same, provided the functionality described herein is realized.

Figure 4:
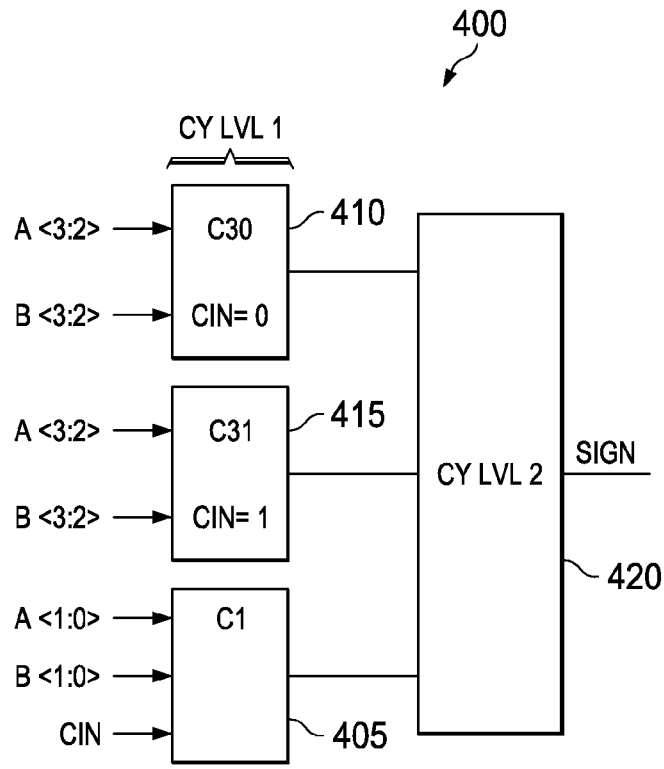
FIG. 4 is a block diagram of an exemplary adder and sign detection circuitry according to an embodiment of the present invention.

FIG. 4 shows an exemplary schematic of a circuit 400 for implementing the adder circuit 306 and sign detect circuit 307 according to an embodiment of the present invention. The circuit 400 can be configured to implement a carry output of a 4 bit adder with carryin, where the most significant bits (MSBs) of the 4 bit A and B inputs (A<3> and B<3>) have been inverted. A and B inputs can refer to the received signal and the compensation weight to be added, respectively. This arrangement can correctly detect the sign (i.e., whether the signal is a digital high or digital low) of the output an adder circuit, where a 1 output indicates a positive result (the sum of the two 4 bit signed inputs plus carryin is >=0) and a 0 output indicates a negative result (the sum is <0).

Although the addition of signed numbers requires a sign extension on the inputs if the output is wider than the inputs, the addition of unsigned numbers requires 0 extension, which is generally simpler. Therefore, the inversion of the data MSBs shown in FIG. 4 is part of a signed to unsigned conversion. Each of the A and B inputs is a 4 bit signed number with a range from −8 to 7.

Complementing the MSB is equivalent to adding 8 to the adder sum, which converts any number in the range to unsigned numbers in the range from 0 to 15. Therefore, instead of having a result >=0, the result can instead be >=16 because of the 8 added to each input value. Accordingly, when the two unsigned 4 bit numbers are added together, the $5^{th}$ bit of the sum, representing 16, is the carryout of the 4 bit adder. Therefore, the adder/comparator can be reduced to a 4 bit carry generation circuit using a carrying (CIN) to indicate whether the 4 bit numbers have been converted or not, where CIN=1 indicates conversion and CIN=0 indicates no conversion and thus no carryin needed.

In circuit 400 shown in FIG. 4 the C1 block 405 computes the carryout of bit 1 given the inputs A<1:0>, B<1:0> and a carryin (CIN). The logic function for block 405 can be the following:

$$C1=A<1>B<1>+(A<1>+B<1>)(A<0>B<0>+ (A<0>+B<0>)CIN)$$

The C30 block 410 can compute the 2 bit carryout of the bits <3:2>, assuming a 0 value for the carryin. The logic function for this block can be:

$$C30=A<3>B<3>+(A<3>+B<3>)(A<2>13<2>)$$

The C31 block 415 can compute the 2 bit carryout of the bits <3:2>, assuming a 1 value for CIN. The logic function for block 415 can be:

$$C31=A<3>B<3>+(A<3>+B<3>)(A<2>+B<2>)$$

The CY_LVL2 block 420 can then compute the sign as the 4 bit carryout from the respective 2 bit carryout signals from blocks 405, 410 and 415. The logic function for block 420 can be:

$$SIGN=C30+C31+C1$$

It is noted that the most significant bit (MSB) inversion is outside of block 420. Accordingly, circuit 400 shown in FIG. 4 is operable to implement the computation of the carryout of a 4 bit addition, but not the MSB inversion.

Figure 5:
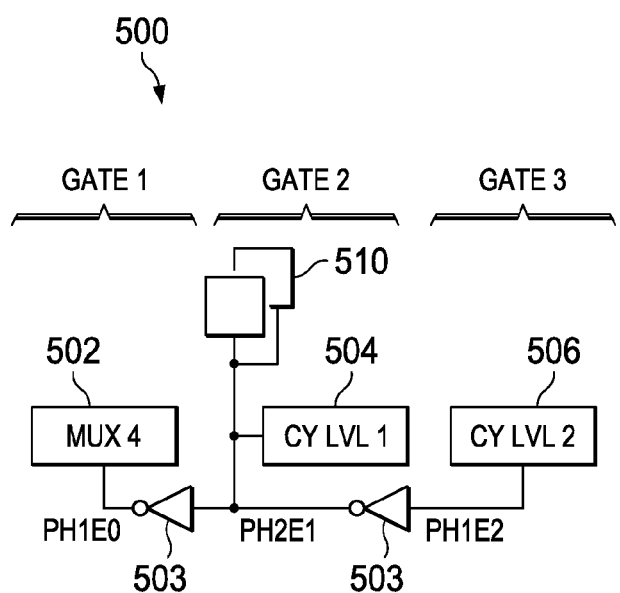
FIG. 5 is a block diagram of a first embodiment of a DFE sub-circuit using a domino gate arrangement, according to an embodiment of the present invention.

Dynamic logic can be used for each of the logic blocks 405, 410, 415 and 420 shown in FIG. 4 to realize a single gate implementation, wherein no more than 3 transistors are in series in the n channel discharge path. For example, FIG. 5 shows an exemplary circuit 500 for a carry_lvl1_CIN block which can implement the C1 block 405 shown in FIG. 4. The block requires dual rail signal inputs for the A, B and CIN signals, and produces dual rail outputs Y and YX.

Therefore, the 4 input tree multiplexers in FIGS. 3A and 3B can be implemented with one logic gate stage circuit, while the adder 306 and sign bit detect circuit 307 can be implemented with two logic gates, such as described above relative to FIG. 4. Therefore, the entire clock cycle can be configured such that only three logic gates are required, as shown in FIG. 5, and can be clocked as domino gates. As shown in FIG. 5, the gate 1 time slot in the clock cycle can taken up by the 4 bit tree multiplexer 502, the gate 2 time slot can be used by the carry level 1 gates 504, and the gate 3 time slot can be used by the carry level 2 gates 506. The clock signals for the various gates can be separated by output inverters 503, 505. As used herein, gate delays and clock delays are counted in numbers of inversions. Therefore, a single domino gate requires two inversions of delay, one in the n-channel pulldown stack and the other in the output inverter. Therefore, when three domino gates are included in a clock cycle, such as in FIG. 5, the clock cycle is generally six inversions in duration.

Figure 6:
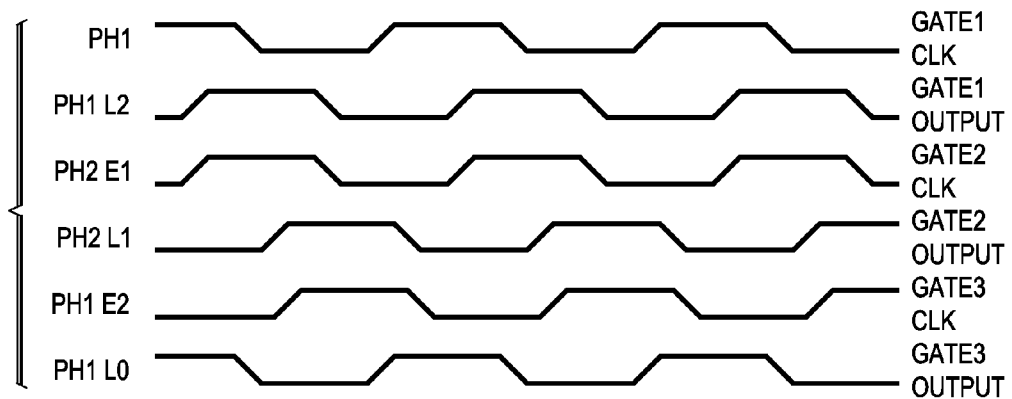
FIG. 6 is a waveform diagram for the operation of the DFE sub-circuit shown in FIG. 9 according to an embodiment of the present invention.

As known in the art, domino gates have a clock as its input and will output a clocked signal. However, the output of the Domino gate is generally a two inversion delayed version of that clock. For example, as shown in FIG. 6, if the top clock waveform PH1 is the input signal for gate 1, the output for gate 1 will be two inversions delayed as shown by the next waveform, PH1L2, where L2 denotes the waveform is late by two inversions. For gate 2, the clock is one inversion earlier than gate 1's PH1 signal, as shown in FIG. 5, so it is the opposite polarity clock, called PH2, and it is early by one inversion, so it is named PH2E1, where E1 denotes the waveform is early by one inversion. Referring back to FIG. 6, at the six inversion clock cycles, the PH2E1 clock of gate 2 exactly lines up with the PH1L2 output of gate 1. Therefore, the data and clock input signal arrival times for gate 2 line up as required for correct domino gate operation. As in gate 1, the output of gate 2 can also be two inversions delayed from its PH2E1 clock, resulting in the PH2L1 (late by 1) waveform shown in FIG. 10. Gate 3 can then operates off the PH1E2 clock whose waveform is shown in FIG. 10. Again, the input clock for gate 3 can aligns in time with its data inputs, the PH2L1 outputs of gate 2. Therefore, Gate 3's output with PH1L0 timing matches the PH1L0 clock timing of the gate it subsequently drives, gate 1.

In the exemplary embodiment shown in FIG. 5, gate 2 is driven by a ph2 clock, but with ph1 input data signals and these inputs can have the opposite clock polarity as the gate's clock input. Likewise, gate 3 is driven by a ph1 clock and ph2 data inputs. Again, the clock and data can have opposite clock phases, but the three inversion delay difference between the data and the clock at that clock rate can be equivalent to half a clock cycle.

Figure 7:
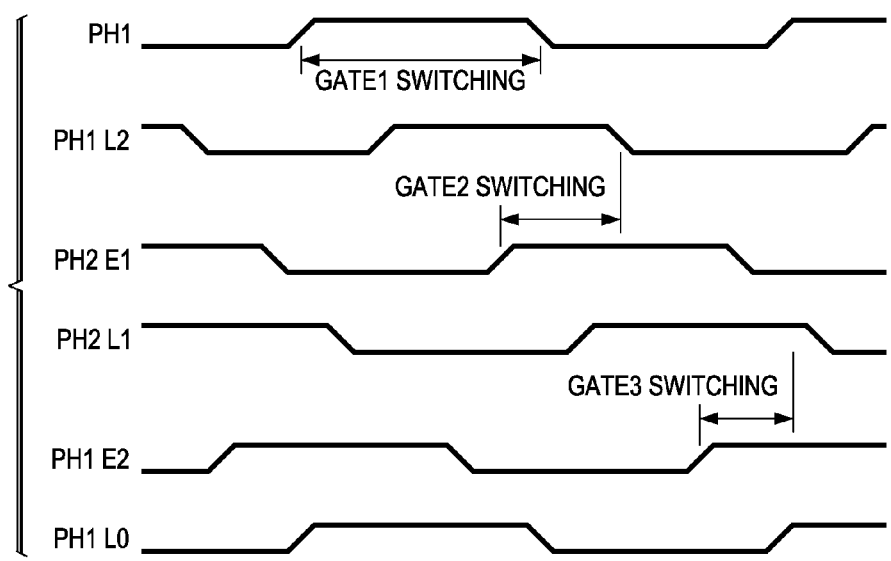
FIG. 7 is a waveform diagram for the operation of the DFE sub-circuit shown in FIG. 9 at a lowest clock rate according to an embodiment of the present invention.

FIG. 7 shows operation of the circuit 500 at a lower clock frequency. For gate 1, both its clock and data inputs can have PH1L0 timing, therefore nothing changes except that the clock cycle becomes longer. For gate 2, after its PH2E1 input clock rises, there are three inversions of delay before its PH1L2 input data changes. Therefore, as a result of the longer time period, the n channel stack transistors discharge the domino gate dynamic nodes. This switching time is shown in FIG. 7. Likewise, gate 3's inputs and clock have opposite clock phasing, so when the PH1E2 clock arrives there are three inversions of delay to discharge the domino gate's dynamic nodes before the PH2L1 inputs return to 0. Therefore, two latches per clock cycle can be implemented and can allow the feedback loop to be closed into a one cycle pipeline. Gate 2 and gate 3 can each implement hold-time latches.

Note that in the schematic of FIG. 5, the carry lvl2 gate has a foot switch 510, i.e., a gate in the discharge path connected to the clock. This can allow a non-conducting discharge path when the clock is low and the domino gate is in the precharge phase. In some embodiments, the carry_lvl1_CIN gate may not have any foot switches in the discharge path. Instead, this gate can get inputs from the 4-input tree multiplexer, as well as the input sample and CIN. However, if both the input sample and CIN signals have PH2E1 timing to match gate 2's clock, then during the pre-charge phase signals will block the discharge path, eliminating the need for a foot switch. Therefore, without a CIN signal, there can be one path which may need a foot switch, where the B dual rail inputs to the cell (from the input sample) turning off are insufficient to block all discharge paths.

Figure 8:
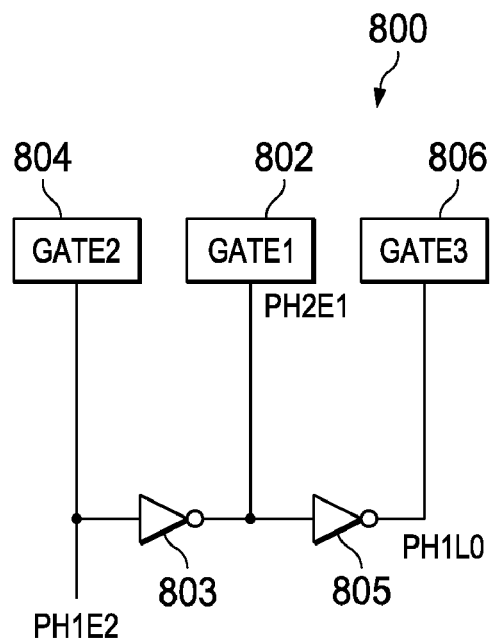
FIG. 8 is a block diagram of a third embodiment of a DFE sub-circuit using a domino gate arrangement according to an embodiment of the present invention.
Figure 9:
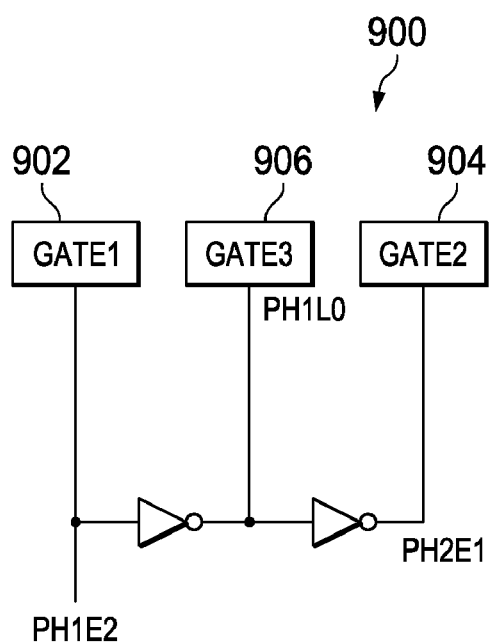
FIG. 9 is a block diagram of a third embodiment of a DFE sub-circuit using a domino gate arrangement according to an embodiment of the present invention.

Although the embodiment described above show gates 2 and 3 as being hold tine latches, the invention is not limited in this regard. For example, configurations other than hold time latches among the three gates are possible. In one embodiment, as shown by circuit 800 in FIG. 8, gate 3 806 is not a hold time latch. Furthermore, when gate 3 806 is no longer a hold time latch, the foot switch is no longer required. In another embodiment, instead of gate 3 806 being a hold time latch, gate 2 804 and gate 1 802 are hold time latches. However, gate 1 802 does not require a foot switch if its data inputs (the outputs from the earlier multiplexers of FIG. 5) have the same PH2E1 timing as its clock. In another embodiment, as shown by circuit 900 in FIG. 9, gate 2 904 is not the hold time latch. Instead, gate 1 902 and gate 3 906 are implemented as the hold time latches.

Although the exchange of data signals between integrated circuits has been discussed in accordance with the present invention, it is appreciated by the Inventor that the invention described herein is equally applicable to filter other types of signals and on various types of devices. The invention is also not limited to the use of silicon wafers, and may be implemented in association with the manufacture of various semiconductor devices.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

What is claimed is:

1. An integrated circuit, comprising:
   a decision feedback equalizer (DFE) formed on said integrated circuit operable to receive a received stream of bits and provide a stream of sign bits, said DFE comprising:
   a first digital equalizer logic comprising, adder circuitry, and sign bit detection circuitry operable to compensate a first portion of bits in said received stream of bits and provide first sign bits for said stream of sign bits; and
   a second digital equalizer logic comprising, adder circuitry, and sign bit detection circuitry running concurrently with said first equalizer logic and connected in parallel relative to said first equalizer logic, said second equalizer operable to compensate at least a portion of said received stream of bits other than said first portion of bits and provide other sign bits for said stream of sign bits, wherein said second equalizer logic comprises:
   a low sign bit pipeline circuitry operative to provide a first conditional sign bit by assuming a low sign bit for a one of said first bits being concurrently processed by said first equalizer logic, and
   a high sign bit pipeline circuitry operative to provide a second conditional sign bit output by assuming a high sign bit for said concurrently processed one of said first bits, and
   a sign bit selection element coupled to receive said first and said second conditional sign bits and a sign bit outcome for said concurrently processed one of said first bits and operable to select between said first and second conditional sign bits based on said sign bit outcome;
   wherein said first equalizer logic, said low sign bit pipeline circuitry, and said high sign bit pipeline circuitry each compensate said received bits using one of a plurality of compensation weights, and wherein said used one of said compensation weights is chosen based on most recent ones of said first conditional sign bit, said second conditional sign bit, and said sign bit outcome.

2. The integrated circuit of claim 1, wherein said first and second equalizer logic operate at a clock rate that is one half a bit rate of said received stream of bits.

3. The integrated circuit of claim 1, wherein said DFE further comprises at least one sampling element operable for alternately dividing said received stream of bits into said first portion of bits and said bit stream other than said first portion of bits.

4. The integrated circuit of claim 1, further comprising combining circuitry for combining said first portion of said stream of sign bits and an output of said sign bit selection element to provide said compensated stream of sign bits.

5. The integrated circuit of claim 1, wherein said first equalizer logic, said low sign bit pipeline circuitry, and said high sign bit pipeline circuitry each further comprise weight selection circuitry, said weight selection circuitry comprising a two-level multiplexer tree comprising a first multiplexer comprising level operable to receive said plurality of compensation weights and having outputs coupled to a second multiplexer comprising level, wherein an output of said second level is coupled to an input of said adder.

6. The integrated circuit of claim 5, wherein said most recent sign bit outcome from said first equalizer logic is operable as a select for said second level and said most recent said first and second conditional bits sign bits are operable as selects for said first level.

7. The integrated circuit of claim 6, wherein said first level comprises a pair of multiplexers, wherein a first of said pair of multiplexers is controlled by said first conditional sign bit and a second of said pair of multiplexers is controlled by said second conditional sign bit.

8. The integrated circuit of claim 5, wherein said two-level multiplexer tree comprises a domino logic gate.

9. The integrated circuit of claim 8, wherein said two-level multiplexer tree consists essentially of a single domino logic gate.

10. The integrated circuit of claim 8, wherein said two-level multiplexer tree, said adder and said sign bit detection circuitry each comprise at least one domino logic gate, wherein said domino gates in two of said two-level multiplex tree, said adder and said sign bit detection circuitry have data input signals of opposite clock polarity compared to a polarity of the respective gate clock input signals.

11. The integrated circuit of claim 10, wherein there are at least three inversions of delay between a turn-on of said gate clock input signals and the turnoff of their respective data input signals.

12. The integrated circuit of claim 1, wherein said first sign bits, and said first and said second conditional bits sign bits are dual rail signals.

13. The integrated circuit of claim 1, wherein said adder and said sign bit detection circuitry each comprise two domino logic gate stages.

14. A method of parallel processing in a decision feedback equalizer (DFE) having at least a first and a second pipeline connected in parallel, comprising:
receiving a stream of bits at an input of DFE;
processing a first portion of bits in said stream of bits using said first pipeline to provide first sign bits of a stream of sign bits,
concurrently processing at least a portion of said bits in said bit stream other than said first portion of bits using said second pipeline, wherein said concurrently processing comprises:
generating a first conditional sign bit output by assuming a low sign bit for a one of said first bits being concurrently processed by said first pipeline and a second conditional sign bit output by assuming a high sign bit for said concurrently processed one of said first bits, and
selecting between said first and second conditional sign bits based on a sign bit outcome for said concurrently processed one of said first bits,
wherein said first and said second pipelines each compensate said received bits using one of a plurality of compensation weights, and wherein said used one of said compensation weights is chosen based on most recent ones of said first conditional sign bit, said second conditional sign bit, and said sign bit outcome.

15. The method of claim 14, wherein processing for said stream of bits alternates between said first and said second pipelines.

16. The method of claim 15, further comprising combining said first sign bits with results of said selecting to provide said compensated stream of sign bits.

17. The method of claim 16, wherein said first and second pipeline each operate at a clock rate that is one half a bit rate of said stream of bits.

18. The method of claim 14, wherein said first sign bits, and said first and said second conditional bits sign bits are dual rail signals.

19. The method of claim 14, wherein said first pipeline, said low sign bit pipeline circuitry and said high sign bit pipeline circuitry each comprise a two-level multiplexer tree for choosing said used one of said plurality of compensation weights.

20. The method of claim 19, wherein said first level comprises a pair of multiplexers, wherein a first of said pair of multiplexers is controlled by said first conditional sign bit and a second of said pair of multiplexers is controlled by said second conditional sign bit.

* * * * *